(12) United States Patent
Ichihara

(10) Patent No.: US 9,391,521 B2
(45) Date of Patent: Jul. 12, 2016

(54) CHOPPER APPARATUS

(75) Inventor: Masafumi Ichihara, Chiyoda-ki (JP)

(73) Assignee: Mitsubishi Electric Corporation, Tokyo (JP)

( * ) Notice: Subject to any disclaimer, the term of this patent is extended or adjusted under 35 U.S.C. 154(b) by 100 days.

(21) Appl. No.: 13/812,426

(22) PCT Filed: Jul. 28, 2010

(86) PCT No.: PCT/JP2010/062710
§ 371 (c)(1),
(2), (4) Date: Jan. 25, 2013

(87) PCT Pub. No.: WO2012/014292
PCT Pub. Date: Feb. 2, 2012

(65) Prior Publication Data
US 2013/0128633 A1   May 23, 2013

(51) Int. Cl.
| H02M 5/45 | (2006.01) |
| H02M 3/24 | (2006.01) |
| H02J 7/34 | (2006.01) |
| H02M 5/458 | (2006.01) |
| H02M 1/08 | (2006.01) |
| H02M 3/156 | (2006.01) |

(52) U.S. Cl.
CPC ............. *H02M 3/24* (2013.01); *H02J 7/345* (2013.01); *H02M 1/08* (2013.01); *H02M 3/156* (2013.01); *H02M 5/458* (2013.01)

(58) Field of Classification Search
CPC . H02M 5/458; H02M 5/4585; H02M 5/4505; H02M 1/32; H02M 1/38; H02M 1/34; H02M 1/40; H02M 7/48; H02M 7/5387; H02M 7/53806; H02M 7/53803; H02M 7/53871; H02M 7/538; H02M 7/53875; H02M 7/53835; H02M 7/5381; H02M 7/537; H02M 7/53846

USPC .......... 363/37, 16, 17, 24–25, 34, 52, 55, 363/56.01–56.12, 75–78, 81–82, 124, 363/131–134; 323/284

See application file for complete search history.

(56) References Cited

U.S. PATENT DOCUMENTS

| 4,761,726 | A | * | 8/1988 | Brown ............................ 363/51 |
| 4,934,822 | A | * | 6/1990 | Higaki ............................ 363/37 |
| 5,594,634 | A | * | 1/1997 | Rajashekara et al. .......... 363/98 |
| 6,337,801 | B2 | * | 1/2002 | Li et al. ......................... 363/127 |
| 8,309,878 | B2 | * | 11/2012 | Winn ........................ 219/121.54 |
| 8,503,200 | B2 | * | 8/2013 | Chapman et al. ............... 363/41 |
| 8,605,461 | B2 | * | 12/2013 | Hibino ............................. 363/17 |
| 2002/0024828 | A1 | * | 2/2002 | Hayashi et al. ................. 363/35 |
| 2008/0123225 | A1 | * | 5/2008 | Matsubara et al. ............. 361/15 |
| 2011/0001464 | A1 | | 1/2011 | Kondo et al. |
| 2013/0119763 | A1 | * | 5/2013 | Zhu et al. ....................... 307/43 |

FOREIGN PATENT DOCUMENTS

| JP | 9-219972 A | 8/1997 |
| JP | 9-261973 A | 10/1997 |
| JP | 10-155298 A | 6/1998 |
| JP | 10-164862 A | 6/1998 |
| JP | 2009-27763 A | 2/2009 |
| JP | 2009-232526 A | 10/2009 |

* cited by examiner

*Primary Examiner* — Gary L Laxton
*Assistant Examiner* — Kevin H Sprenger
(74) *Attorney, Agent, or Firm* — Sughrue Mion, PLLC

(57) ABSTRACT

Positive-side DC terminals P1' and P' connected to a positive-side DC bus of a chopper 4 are provided in the chopper 4 and the positive-side DC terminals P1' and P' are connected to positive-side DC terminals P1 and P, respectively. With this configuration, a current of a DC bus of an inverter 2 is drawn via the positive-side DC terminal P1' into the chopper 4 and is returned via the positive-side DC terminal P' to the DC bus of the inverter 2.

12 Claims, 2 Drawing Sheets

CHOPPER APPARATUS

CROSS REFERENCE TO RELATED APPLICATIONS

This application is a National Stage of International Application No. PCT/JP2010/062710, filed on Jul. 28, 2010, the contents of all of which are incorporated herein by reference in their entirety.

FIELD

The present invention relates to a chopper apparatus that is chargeable and dischargeable between a storage capacitor.

BACKGROUND

To make it possible to accumulate regenerative energy generated on a load side for reusing it and to level the power received from a power system, there is a method of connecting a chopper to an inverter (Patent Literature 1).

CITATION LIST

Patent Literature

Patent Literature 1: Japanese Patent Application Laid-open No. 2009-27763

SUMMARY

Technical Problem

However, according to the conventional technique mentioned above, because a chopper is connected between a positive side and a negative side of a DC bus of an inverter, only a DC bus voltage can be detected on a side of the chopper. Accordingly, when the DC bus voltage is reduced, whether this voltage reduction is caused by power-running or by a voltage reduction due to a reduction of a system voltage is difficult to be determined.

As a result, to level the received power in the chopper, when the system voltage is reduced, a release command and a release amount command that instructs how much energy has to be released need to be given from outside to the chopper so as to operate the chopper in an energy releasing direction.

To give the release command and the release amount command to the chopper from outside, it is necessary to detect how much load is used as the inverter is performing power-running, thereby deciding a required release amount command. Therefore, a detector and a controller therefor need to be prepared separately from the chopper. Furthermore, in existing facilities where the detector and the controller are difficult to be additionally provided, it is difficult to level the received power in the chopper.

The present invention has been achieved in view of the above problems, and an object of the present invention is to provide a chopper apparatus that can determine a power-running state of an inverter on a side of a chopper without detecting at outside of the chopper as to how much load is used as the inverter is performing power-running.

Solution to Problem

There is provided a chopper apparatus that performs charging/discharging by connecting/disconnecting an energizing path of a DC voltage supplied from a DC bus, wherein a first positive-side DC terminal connectable to one end of divided parts of the DC bus and a second positive-side DC terminal connectable to the other end of the divided parts are provided and a current of the DC bus is drawn via the first positive-side DC terminal into the chopper apparatus and is returned via the second positive-side DC terminal to the DC bus.

Advantageous Effects of Invention

According to the present invention, a power-running state of an inverter can be determined on a side of a chopper without detecting at outside of the chopper as to how much load is used as the inverter is performing power-running.

DESCRIPTION OF EMBODIMENTS

Exemplary embodiments of a chopper apparatus according to the present invention will be explained below in detail with reference to the accompanying drawings. The present invention is not limited to the embodiments.

Figure 1:
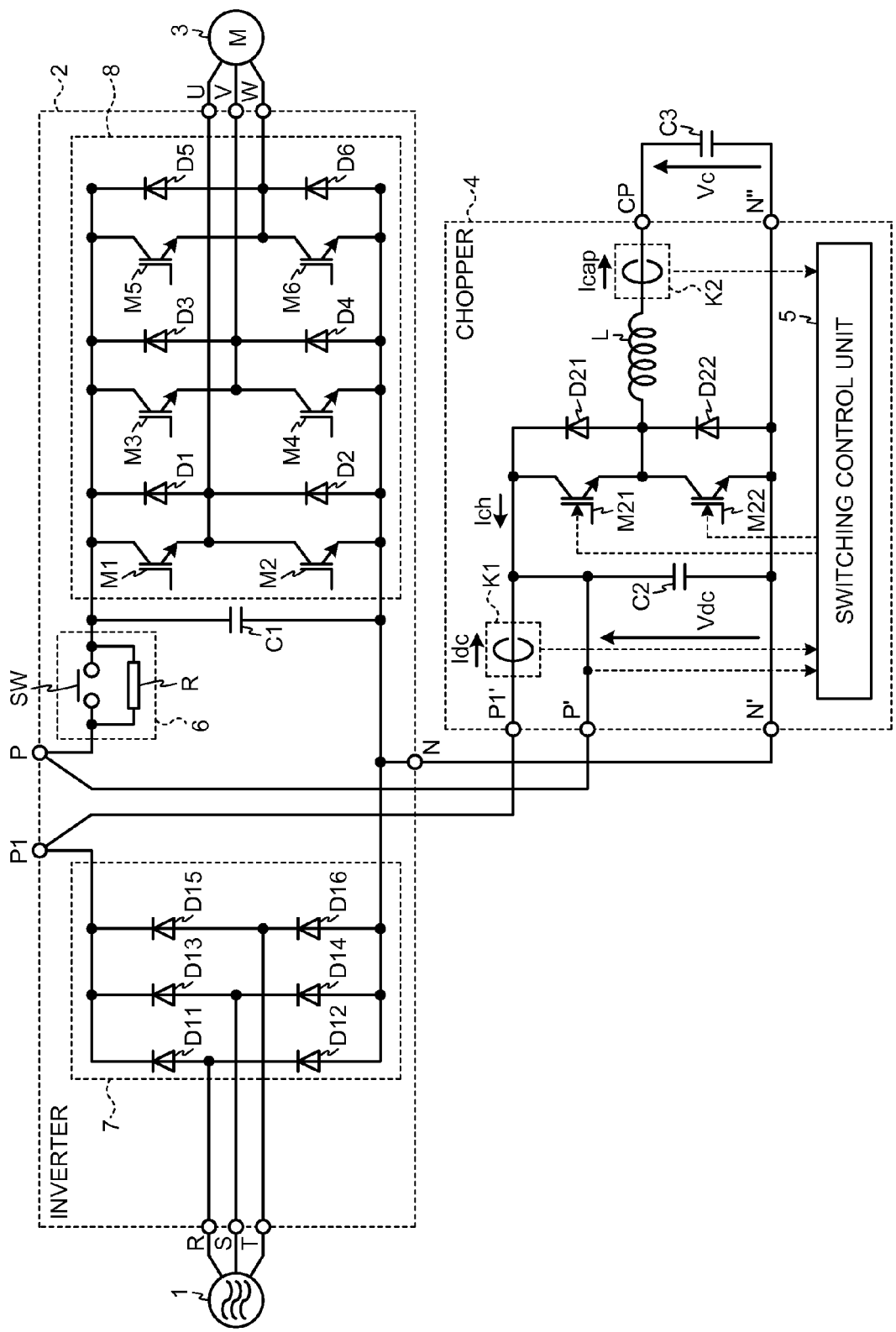
FIG. 1 is a circuit diagram of a schematic configuration of a chopper apparatus and an inverter according to an embodiment of the present invention.

FIG. 1 is a circuit diagram of a schematic configuration of a chopper apparatus and an inverter according to an embodiment of the present invention. With reference to FIG. 1, an inverter 2 includes a rectifier circuit 7, a smoothing capacitor C1, an arm circuit 8, and an inrush-current prevention circuit 6.

An AC power supply 1 is connected to the rectifier circuit 7, and a load 3 is connected to the arm circuit 8. The arm circuit 8 is connected via the smoothing capacitor C1 to a subsequent stage of the rectifier circuit 7. The load 3 can be an AC motor or an electronic device operated by an alternating current.

In this example, the rectifier circuit 7 includes rectifier diodes D11 to D16. The rectifier diodes D11 and D12 are serially connected to each other, the rectifier diodes D13 and D14 are serially connected to each other, and the rectifier diodes D15 and D16 are serially connected to each other.

A serial circuit of the rectifier diodes D11 and D12, a serial circuit of the rectifier diodes D13 and D14, and a serial circuit of the rectifier diodes D15 and D16 are connected between a positive side and a negative side of a DC bus, respectively.

A connection point of the rectifier diodes D11 and D12, a connection point of the rectifier diodes D13 and D14, and a connection point of the rectifier diodes D15 and D16 are connected to three-phase voltage-input terminals R, S, and T, respectively.

The arm circuit 8 further includes switching elements M1 to M6 and free wheeling diodes D1 to D6. The free wheeling diodes D1 to D6 are connected in parallel to the switching elements M1 to M6, respectively. The switching elements M1 and M2 are serially connected to each other, the switching elements M3 and M4 are serially connected to each other, and the switching elements M5 and M6 are serially connected to each other.

A serial circuit of the switching elements M1 and M2, a serial circuit of the switching elements M3 and M4, and a serial circuit of the switching elements M5 and M6 are connected between the positive side and the negative side of the DC bus, respectively.

A connection point of the switching elements M1 and M2, a connection point of the switching elements M3 and M4, and a connection point of the switching elements M5 and M6 are connected to three-phase voltage-output terminals U, V, and W, respectively.

The inrush-current prevention circuit 6 is interposed between the rectifier circuit 7 and the arm circuit 8. The inrush-current prevention circuit 6 includes a switch SW and a resistor R, and the switch SW and the resistor R are connected in parallel to each other.

A positive-side DC bus of the inverter 2 is divided between the rectifier circuit 7 and the inrush-current prevention circuit 6. A positive-side DC terminal P1 is provided at one end of divided parts of the positive-side DC bus of the inverter 2 and a positive-side DC terminal P is provided at the other end of the divided parts of the positive-side DC bus of the inverter 2. A negative-side DC terminal N is provided at a negative-side DC bus of the inverter 2. A reactor that reduces ripples on the DC bus can be externally attached to the inverter 2 at the positive-side DC terminals P1 and P. The divided parts can be provided between the inrush-current prevention circuit 6 and the arm circuit 8.

A chopper 4 includes switching elements M21 and M22, free wheeling diodes D21 and D22, and an inductor L. The free wheeling diodes D21 and D22 are connected in parallel to the switching elements M21 and M22, respectively. The switching elements M21 and M22 are serially connected to each other. A serial circuit of the switching elements M21 and M22 is connected between a positive side and a negative side of a DC bus of the chopper 4.

As the switching elements M1 to M6, M21, and M22, a field effect transistor, a bipolar transistor, or an IGBT can be used. As the material of the switching elements M21 and M22, a wide bandgap semiconductor such as a silicon carbide material, a gallium nitride material, or diamond can be used.

By using a wide bandgap semiconductor as the material of the switching elements M21 and M22, a loss of the switching elements M21 and M22 can be reduced significantly and the switching elements can withstand operations at a high temperature. Therefore, the switching elements M21 and M22 can be incorporated in the chopper 4 without interposing a substrate for cooling or providing a cooling mechanism such as a fan or a fin at outside.

A smoothing capacitor C2 is connected in parallel to the serial circuit of the switching elements M21 and M22. The inductor L is connected between a connection point of the switching elements M21 and M22 and a charging/discharging terminal CP.

The chopper 4 also includes positive-side DC terminals P1' and P' and negative-side DC terminals N' and N". In this example, the positive-side DC terminals P1' and P' can be connected to the positive-side DC terminals P1' and P', respectively. It is configured such that the positive-side DC terminals P1' and P' are connected to a positive-side DC bus of the chopper 4, a current of the DC bus of the inverter 2 is drawn via the positive-side DC terminal P1' into the chopper 4 and the current is returned via the positive-side DC terminal P' to the DC bus of the inverter 2.

The negative-side DC terminals N' and N" are connected to a negative-side DC bus of the chopper 4. The negative-side DC terminal N' is connected to the negative-side DC terminal N, and a storage capacitor C3 is connected between the negative-side DC terminal N" and the charging/discharging terminal CP. A capacitor such as a secondary battery can be used instead of the storage capacitor C3.

The chopper 4 also includes a current sensor K1 that detects a current Idc of the DC bus of the inverter 2, a current sensor K2 that detects a current Icap of the inductor L, and a switching control unit 5 that controls a duty of the switching elements M21 and M22 based on a detected value of the current Idc of the DC bus, a detected value of a voltage Vdc of the DC bus, and a detected value of the current Icap of the inductor L.

In the inverter 2, an alternating current supplied from the AC power supply 1 is rectified by the rectifier circuit 7 and smoothed by the smoothing capacitor C1, thereby converted into a direct current. The direct current output via the smoothing capacitor C1 is converted into an alternating current by being connected/disconnected according to switching operations of the switching elements M1 to M6 and the alternating current is output to a load M.

At the time of activating the inverter 2, the switch SW is switched off and a current is caused to flow from the rectifier circuit 7 via the resistor R, so that an inrush current is prevented. Thereafter, when the smoothing capacitor C1 is charged to a predetermined value or larger and the inrush current is not generated, the switch SW is switched on.

Furthermore, the chopper 4 discharges energy insufficient on a side of the inverter 2 from the storage capacitor C3 into the inverter 2 or charges energy exceeding on the side of the inverter 2 into the storage capacitor C3.

Figure 2:
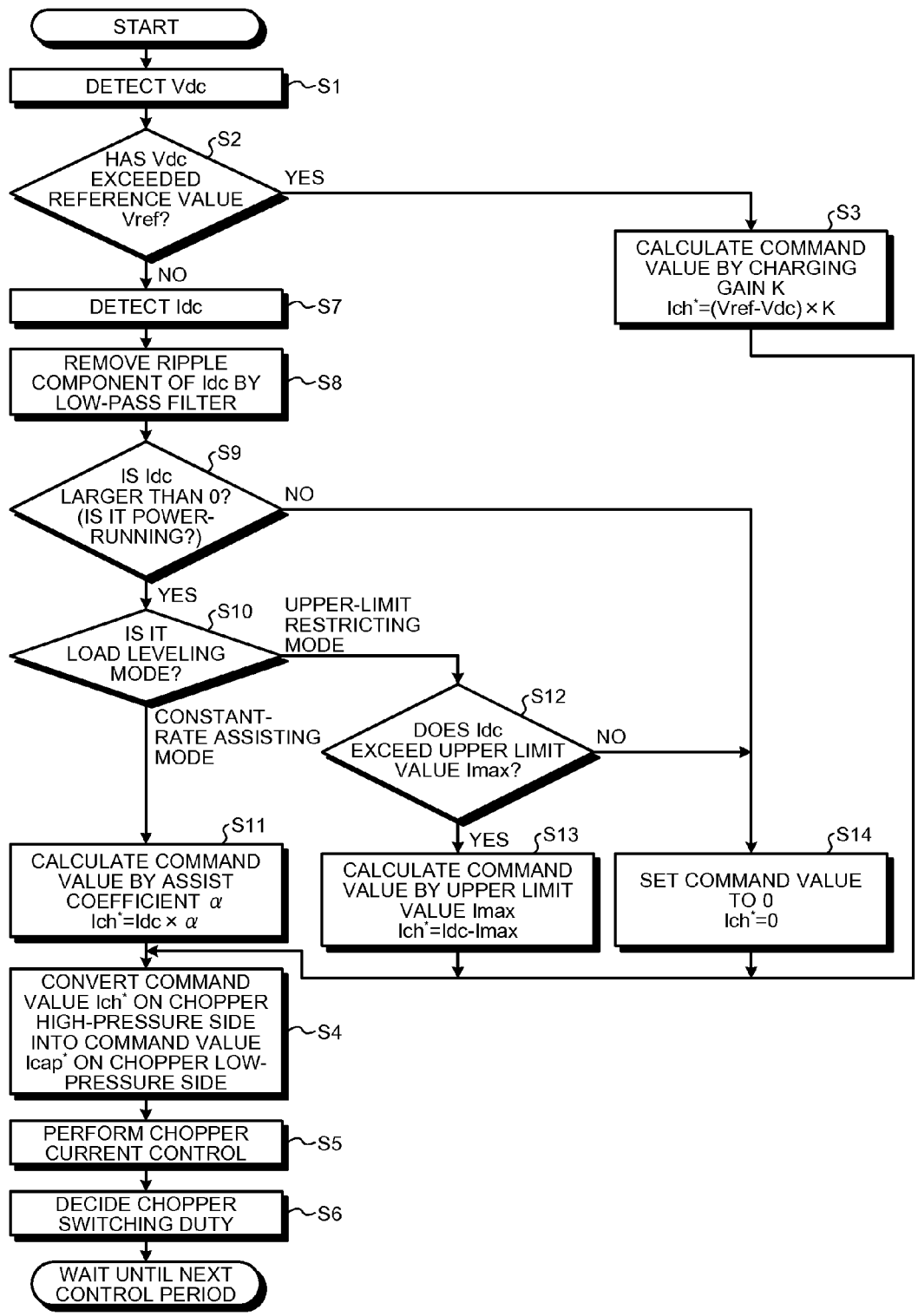
FIG. 2 is a flowchart of a chopper control method of the chopper apparatus shown in FIG. 1.

FIG. 2 is a flowchart of a chopper control method of the chopper apparatus shown in FIG. 1. With reference to FIG. 2, a voltage of a DC bus is input to the switching control unit 5 and the voltage Vdc of the DC bus is detected (Step S1).

The switching control unit 5 then determines whether a detected value of the voltage Vdc of the DC bus has exceeded a reference value Vref (Step S2), and when the detected value of the voltage Vdc of the DC bus has exceeded the reference value Vref, a duty of the switching elements M21 and M22 is controlled so that the storage capacitor C3 is charged.

That is, the switching control unit 5 calculates a command value Ich* of a current Ich of a DC bus of the chopper 4 by the following equation where a charging gain is denoted by K, and absorbs a current proportional to an exceeding amount of the voltage Vdc with respect to the reference value Vref via the chopper 4 (Step S3).

$$Ich^* = (Vref - Vdc) \times K$$

With this process, when regenerative energy is increased, it is possible to increase the energy absorbed via the chopper 4 correspondingly, the regenerative energy can be reused, and thus energy saving can be realized.

Next, the command value Ich* of the current Ich of the DC bus of the chopper 4 is converted into a command value Icap* of the current Icap of the inductor L (Step S4). Subsequently, by performing a chopper current control so that the detected value of the current Icap of the inductor L approximates the command value Icap* of the current Icap of the inductor L (Step S5), the duty of the switching elements M21 and M22 is set (Step S6).

By converting the command value Ich* of the current Ich of the DC bus of the chopper 4 into the command value Icap* of the current Ich of the inductor L, the current Ich of the DC bus of the chopper 4 does not need to be detected. Accordingly, the duty of the switching elements M21 and M22 can be set without being influenced by variations in the current Ich of the DC bus of the chopper 4, and thus the chopper current control can be stabilized.

On the other hand, when the detected value of the voltage Vdc of the DC bus is equal to or smaller than the reference value Vref, the switching control unit 5 detects the current Idc of the DC bus (Step S7). After a ripple component is removed from the detected value of the current Idc of the DC bus via a low-pass filter (Step S8), whether the detected value of the current Idc of the DC bus has exceeded 0 is determined (Step S9). When the detected value of the current Idc of the DC bus is equal to or smaller than 0, the duty of the switching elements M21 and M22 is controlled so that the detected value of the current Icap of the inductor L becomes 0.

That is, the switching control unit 5 sets the command value Ich* of the current Ich of the DC bus to 0 (Step S14), and the process proceeds to Step S4.

Meanwhile, when the detected value of the current Idc of the DC bus has exceeded 0, a constant-rate assisting mode or an upper-limit restricting mode is selected as a load leveling mode (Step S10). The load leveling mode is a mode of supplying all or a part of energy required for power-running of the inverter 2 via the chopper 4 and leveling input power of the inverter 2.

When the constant-rate assisting mode is selected, the duty of the switching elements M21 and M22 is controlled so that a part of the current Idc of the DC bus is supplied from the storage capacitor C3.

That is, the switching control unit 5 calculates the command value Ich* of the current Ich of the DC bus of the chopper 4 by the following equation, where an assist coefficient is denoted by α, and discharges a current proportional to the current Idc of the DC bus via the chopper 4 (Step S11).

$$Ich^* = Idc \times \alpha$$

On the other hand, when the upper-limit restricting mode is selected, it is determined whether the detected value of the current Idc of the DC bus has exceeded an upper limit value Imax (Step S12). When the detected value of the current Idc of the DC bus is equal to or smaller than the upper limit value Imax, the process proceeds to Step S14 and the duty of the switching elements M21 and M22 is controlled so that the detected value of the current Icap of the inductor L becomes 0.

Meanwhile, when the detected value of the current Idc of the DC bus has exceeded the upper limit value Imax, the duty of the switching elements M21 and M22 is controlled so that an insufficient amount of the current Idc of the DC bus is supplied from the storage capacitor C3 so that the detected value of the current Idc of the DC bus does not exceed the upper limit value Imax.

That is, the switching control unit 5 calculates the command value Ich* of the current Ich of the DC bus of the chopper 4 by the following equation and discharges a current corresponding to an exceeding amount of the current Idc with respect to the upper limit value Imax via the chopper 4 (Step S13).

$$Ich^* = Idc - Imax$$

When the storage capacitor C3 is charged, the switching element M21 is caused to perform a switching operation. In a period during which the switching element M21 is switched on, the storage capacitor C3 can be charged by passing the current Icap in a positive direction from the DC bus via the switching element M21 to the inductor L. In a period during which the switching element M21 is switched off, the current Icap can be circulated by passing the current Icap in the positive direction from the inductor L sequentially via the storage capacitor C3 and the free wheeling diode D22 and returning the current Icap to the inductor L.

When the storage capacitor C3 is discharged, the switching element M22 is caused to perform a switching operation. In a period during which the switching element M22 is switched on, by passing the current Icap in a negative direction from the storage capacitor C3 sequentially via the inductor L and the switching element M22, electromagnetic energy can be accumulated in the inductor L. In a period during which the switching element M22 is switched off, by passing the current Icap in the negative direction from the storage capacitor C3 sequentially via the inductor L and the free wheeling diode D21 to the DC bus, the storage capacitor C3 can be discharged.

In this example, by drawing the current Idc of the DC bus from the inverter 2 into the chopper 4, the power-running state of the inverter 2 can be determined on a side of the chopper 4 without detecting at outside of the chopper 4 as to how much load 3 is used as the inverter 2 is performing power-running. Therefore, the chopper 4 can be operated at the load leveling mode without applying the release command and the release amount command to the chopper 4 from outside, and a detector and a controller that apply the release command and the release amount command do not need to be prepared separately from a chopper. Accordingly, a system configuration can be simplified and the present invention can be also applied to existing facilities where the detector and the controller are difficult to be additionally provided.

Furthermore, to draw the current Idc of the DC bus from the inverter 2 into the chopper 4, the positive-side DC terminals P1' and P' connectable to the positive-side DC terminals P1 and P are provided in the chopper 4. Accordingly, the configuration of the inverter 2 does not need to be changed, and the chopper 4 can be easily applied to an existing inverter 2.

INDUSTRIAL APPLICABILITY

As described above, the chopper apparatus according to the present invention can determine a power-running state of an inverter on a side of a chopper without detecting at outside of the chopper as to how much load is used as the inverter is performing power-running, and the chopper apparatus is suitable for a method of assisting an inverter by a chopper.

REFERENCE SIGNS LIST

1 AC power supply
2 inverter
3 load
4 chopper
5 switching control unit
6 inrush-current prevention circuit
7 rectifier circuit
8 arm circuit
D1 to D6, D21, D22 free wheeling diode
D11 to D16 rectifier diode
M1 to M6, M21, M22 switching element
P, P1, P', P1' positive-side DC terminal
N, N', N" negative-side DC terminal
CP charging/discharging terminal
SW switch
R resistor
C1, C2 smoothing capacitor
L inductor
C3 storage capacitor
K1, K2 current sensor

The invention claimed is:

1. A chopper apparatus that performs charging/discharging by connecting/disconnecting an energizing path of a DC voltage supplied from a positive-side DC bus of an inverter to which the chopper apparatus is connected, the chopper apparatus comprising:

a DC bus connecting portion including a first positive-side DC terminal connectable to a first part of the DC bus of the inverter and a second positive-side DC terminal connectable to a second part of the DC bus of the inverter to connect the first part of the DC bus and the second part of the DC bus in series, the first and second positive-side DC terminal being connected to a positive-side DC bus of the chopper apparatus;

a first negative-side DC terminal connectable to a part of a negative-side DC bus of the inverter, the first negative-side DC terminal being connected to a negative-side DC bus of the chopper apparatus;

a second negative-side DC terminal that is connected to the negative-side DC bus of the chopper apparatus; and a charging/discharging portion that is configured to perform charging/discharging of the chopper apparatus including an inductor and a capacitor connected in parallel to the DC bus connecting portion; and a current sensor disposed in the chopper apparatus to detect a current value of the DC bus of the inverter, the control of the chopper apparatus is based on the detected current value of the DC bus measured by the current sensor, wherein the chopper apparatus is configured such that a current of the DC bus of the inverter is drawn via the first positive-side DC terminal into the chopper apparatus and is returned via the second positive-side DC terminal to the DC bus of the inverter.

2. The chopper apparatus according to claim 1, wherein the first part and the second part of the DC bus is provided in the inverter.

3. The chopper apparatus according to claim 2, wherein the first part and the second part of the DC bus is connectable to a reactor that reduces ripples on the DC bus of the inverter.

4. The chopper apparatus according to claim 1, comprising:

a serial circuit of a first switching element and a second switching element that is connected between the first positive-side DC terminal of the DC bus of the chopper apparatus and the first negative-side DC terminal of the DC bus of the chopper apparatus;

the inductor connected between a connection point of the first and second switching elements and a charging/discharging terminal; and a switching control unit that controls a duty cycle of the first and second switching elements based on the current detected value of the DC bus of the inverter, a voltage detected value of the DC bus of the inverter, and a current detected value of the inductor.

5. The chopper apparatus according to claim 4, wherein the switching control unit controls the duty cycle of the first and second switching elements so that the capacitor connected to the charging/discharging terminal is charged when a voltage detected value of the DC bus exceeds a reference value.

6. The chopper apparatus according to claim 4, wherein the switching control unit controls the duty cycle of the first and second switching elements so that the current detected value of the inductor becomes 0 when the voltage detected value of the DC bus is equal to or smaller than a reference value and the current detected value of the DC bus is equal to or smaller than 0.

7. The chopper apparatus according to claim 4, wherein the switching control unit controls the duty cycle of the first and second switching elements so that a part of the current of the DC bus of the inverter is supplied from the capacitor connected to the charging/discharging terminal when the voltage detected value of the DC bus is equal to or smaller than a reference value andthea current detected value of the DC bus exceeds 0.

8. The chopper apparatus according to claim 4, wherein the switching control unit controls the duty cycle of the first and second switching elements so that an amount of the current of the DC bus of the inverter is supplied from the capacitor connected to the charging/discharging terminal so that the current detected value of the DC bus does not exceed an upper limit value when the voltage detected value of the DC bus is equal to or smaller than a reference value and the current detected value of the DC bus exceeds 0.

9. The chopper apparatus according to claim 8, wherein the switching control unit controls the duty cycle of the first and second switching elements so that the amount of the current of the DC bus of the inverter is supplied from the capacitor connected to the charging/discharging terminal so that the current detected value of the DC bus does not exceed an upper limit value when the voltage detected value of the DC bus is equal to or smaller than the reference value and the current detected value of the DC bus exceeds the upper limit value.

10. The chopper apparatus according to claim 8, wherein the switching control unit converts a current command value on a side of the DC bus of the chopper apparatus into a current command value on a side of the inductor, and controls the duty cycle of the first and second switching elements so that a current detected value of the inductor approximates to the current command value on the side of the inductor.

11. The chopper apparatus according to claim 4, wherein the first and second switching elements are constituted by a wide bandgap semiconductor.

12. The chopper apparatus according to claims 11, wherein the wide bandgap semiconductor is made of a silicon carbide material, a gallium nitride material, or diamond.

* * * * *